UNITED STATES PATENT OFFICE.

PARKER C. McILHINEY, OF GREAT NECK, NEW YORK, ASSIGNOR TO CALIFORNIA ALKALI COMPANY, OF SAN FRANCISCO, CALIFORNIA, A CORPORATION OF CALIFORNIA.

PROCESS FOR THE RECOVERY OF POTASSIUM SALTS.

1,338,235.                    Specification of Letters Patent.        Patented Apr. 27, 1920.

No Drawing.         Application filed February 11, 1918.  Serial No. 216,514.

*To all whom it may concern:*

Be it known that I, PARKER C. MCILHINEY, a citizen of the United States, and a resident of Great Neck, North Hempstead, Nassau county, State of New York, (whose post-office address is 50 East 41st street, New York city, N. Y.,) have invented certain new and useful Improvements in Processes for the Recovery of Potassium Salts, of which the following is a specification.

My present invention has relation to an improved process for obtaining salts of potassium in commercially pure form from solutions containing such salts as are found in association in certain natural waters, and particularly from such as contain potassium chlorid or sulfate or both. It is to be understood that, although primarily useful in the extraction of potassium salts from brines actually found in nature, my invention is also applicable to solutions artificially prepared.

My improved process will be found particularly useful in its application to the types of brines found in Searles Lake and Owens Lake in California, wherein potassium chlorid occurs associated with chlorid, sulfate and borate of sodium.

The sodium borate in these and similar brines has offered especial difficulties in the way of successful separation, largely owing to the fact that its relative solubilities in hot and cold water are substantially the same as those of potassium chlorid. This fact makes it impossible to separate the borate from the potassium chlorid by concentration in a hot solution, followed by cooling, as is generally practised in separating the chlorids of sodium and potassium. In view of these difficulties, particularly, the many processes hitherto proposed for extracting potassium salts from brines of the character found in Owens Lake, for instance, have been indirect, tedious and expensive; and it is the principal object of my invention to supply a process whereby direct extraction of the potassium salts is accomplished, and a considerable economy of time and money is attained.

I have discovered that potassium can be separated from the general class of associated salts above mentioned by adding to the natural brine or other solution in which it occurs, generally as a chlorid or sulfate, a soluble salt whose acid radical forms a relatively insoluble salt when combined with potassium alone. When a reagent of this character is employed, the soluble potassium chlorid or sulfate is decomposed and the acid radical of the reagent forms an insoluble salt with the potassium which separates in solid form, either as a precipitate or by slow crystallization. At the same time the associated salts, being unaffected, remain in solution.

Taking the water of Owens Lake as an example whereby to illustrate my complete process, I find it best first to remove the sulfate and most of the carbonate of sodium together with the major part of the sodium chlorid. For this purpose the natural brine is first evaporated to a certain proper concentration, when it is treated with carbonic acid to convert the soluble sodium carbonate to the relatively insoluble bicarbonate, thereby separating a large part of the carbonate by precipitation. This having been accomplished a further evaporation, either by solar heat or by the use of fuel, will cause the separation of the sodium sulfate together with a further portion of the bicarbonate and most of the sodium chlorid in solid form. The potassium chlorid and borax, being much more soluble, will remain in solution, with a small proportion of the sodium chlorid.

It now remains to separate the potassium from the borax, and for this purpose the solution should first be evaporated to such a concentration as corresponds to saturation by the potassium chlorid if the solution were cold. Even a higher concentration than this will be found advantageous, care being taken not to saturate the solution hot, by which is meant a temperature of from about 90 to 100 degrees C. This concentration is not essential to the process, but I prefer to resort to this step for reasons of economy and convenience which will be obvious.

The hot solution having been thus prepared, I next add thereto a very soluble salt whose acid radical forms an insoluble salt with potassium alone, and for this purpose I have found that either the chlorate, perchlorate or silico-fluorid of sodium calcium or magnesium may be used to advantage.

The proportion of the sodium (or other) salt so used can be readily calculated by any chemist. Upon adding this reagent, the sodium and potassium will exchange places, each uniting with the acid radical of the other, thereby forming sodium chlorid and potassium chlorate, perchlorate or other insoluble salt, as the case may be. This insoluble salt will then separate in solid form. It will be found advantageous to add the soluble reagent either in solid form or in a hot solution, and thus to maintain the temperature of the whole mass at such a point that separation of the insoluble potassium salt will not occur at once. By letting the solution cool gradually, after the reaction, the insoluble potassium salt will separate slowly in relatively large crystals. This formation will obviously contribute materially to the purity of the product obtained.

It will be seen that my improved process makes it possible to separate potassium not only from such salts as, like potassium chlorid itself, show a great difference in their degree of solubility in hot as contrasted with cold water, of which borax is an example; but also from other salts, such, for instance, as sodium chlorid which have not this peculiarity.

Where the chlorate of sodium calcium or magnesium is used as a reagent, I am able to produce directly from natural brines a commercially pure potassium chlorate, by a simple and inexpensive process, instead of employing commercial potassium chlorid, as has been done heretofore.

As a variant or modification of my process which is within my invention as broadly claimed, I may produce a soluble chlorate within the solution itself, for the purpose of reacting with the potassium salt in the solution as already described. For this purpose, after the sodium sulfate has been removed by concentration as described, I pass substantially pure chlorin into the solution, whereupon it reacts with the sodium carbonate to form sodium chlorate, which in turn reacts as before stated to form potassium chlorate.

It is one advantage of such a process that the reaction involved serves both to assist in removing the objectionable sodium carbonate and to make this salt useful in production of the desired reagent.

My invention is not confined to the specific reagents mentioned, nor do I limit myself to its application to the separation of potassium from the particular waters mentioned, nor to natural brines as distinguished from artificially prepared solutions. I do not limit myself in my claims to the details of procedure herein set forth, as my improved process is capable of many modifications without departing from the scope of my invention.

I have not herein claimed specifically the use of a soluble chlorate as a reagent in solutions containing borax, as I have made this the subject matter of another application for Letters Patent Serial No. 216,513, filed February 11, 1918.

What I claim is:

1. The process of obtaining a commercially pure potassium salt from a solution containing a soluble potassium salt associated with other salts commonly found in natural brines, which comprises causing said potassium salt to react with a reagent including a soluble salt whose acid radical forms an insoluble single salt with the potassium, and removing the insoluble potassium salt so formed from the solution.

2. The process generally described in claim 1 hereof wherein the reagent used is a perchlorate.

3. The process generally described in claim 1 hereof wherein the solution is concentrated by evaporation before the reagent is brought into operative contact therewith to such a point as to correspond to saturation by the soluble potassium salt when cold.

4. The process generally described in claim 1 hereof wherein the reagent is dissolved in the solution containing the soluble potassium salt.

5. The process generally described in claim 1 hereof wherein the reaction takes place while the solution is kept hot during the reaction, and wherein the potassium salt is crystallized out on gradual cooling of the solution.

6. The process generally described in claim 1 hereof as applied to brine containing sodium carbonate wherein the carbonate is removed by evaporation and concentration before the reagent is brought into operative contact therewith.

7. The process generally described in claim 1 hereof as applied to brine containing sodium carbonate, wherein the solution is treated with carbonic acid to convert the carbonate into bicarbonate of sodium and removing the bicarbonate to facilitate separation before the reagent becomes effective.

8. The process generally described in claim 1 hereof as applied to brine containing sulfate of sodium wherein the sulfate is separated by evaporation and concentration before the reagent is brought into operative contact therewith.

9. The process generally described in claim 1 hereof as applied to brine containing sodium chlorid wherein the sodium chlorid is first largely separated by evaporation and concentration before final separation of the potassium by use of the reagent.

10. The process of separating potassium from a solution wherein it occurs as a soluble salt mixed with borax, which comprises adding to the solution a soluble salt whose acid radical forms an insoluble salt with potassium and removing the salt so produced in solid form from the remaining solution.

11. The process generally described in claim 10 wherein the reaction takes place in a hot concentrated solution and the insoluble potassium salt is allowed to crystallize out by cooling.

12. The process generally described in claim 10 hereof wherein the reagent is a perchlorate.

13. The process generally described in claim 1 hereof wherein the reagent is formed within the solution to be treated by passing chlorin into the solution.

14. The process generally described in claim 1 hereof as applied to a solution containing sodium carbonate wherein the soluble chlorate used as a reagent is formed within the solution by causing chlorin to react with said sodium carbonate.

15. The process generally described in claim 1 hereof as applied to brine containing sodium carbonate, wherein the solution is treated with carbonic acid and wherein the reagent is formed within the solution under treatment by passing chlorin into said solution.

16. The process generally described in claim 1 hereof as applied to brine containing sodium carbonate, wherein the solution is concentrated and treated with carbonic acid to remove a part of the carbonate, subsequently concentrating the remaining solution and treating the remaining solution with chlorin to form the reagent in the solution.

In testimony whereof, I have signed my name to this specification.

PARKER C. McILHINEY.